US011698604B2

(12) United States Patent
Sakamoto (10) Patent No.: US 11,698,604 B2
(45) Date of Patent: Jul. 11, 2023

(54) ELECTRICAL APPARATUS WITH A DUCT HAVING A FIRE WALL

(71) Applicant: Shogo Sakamoto, Kanagawa (JP)

(72) Inventor: Shogo Sakamoto, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 17/689,887

(22) Filed: Mar. 8, 2022

(65) Prior Publication Data

US 2022/0299936 A1 Sep. 22, 2022

(30) Foreign Application Priority Data

Mar. 16, 2021 (JP) ................. 2021-042907

(51) Int. Cl.
| | |
|---|---|
| *G03G 21/00* | (2006.01) |
| *H02K 9/00* | (2006.01) |
| *G03G 21/20* | (2006.01) |
| *H02K 9/06* | (2006.01) |
| *H02K 9/24* | (2006.01) |

(52) U.S. Cl.
CPC ............ *G03G 21/206* (2013.01); *H02K 9/06* (2013.01); *H02K 9/24* (2013.01); *G03G 2221/1645* (2013.01)

(58) Field of Classification Search
CPC ......... G03G 21/206; G03G 2221/1645; H02K 9/06; H02K 9/16; H02K 9/24
USPC ....................................................... 399/92, 93
See application file for complete search history.

(56) References Cited

U.S. PATENT DOCUMENTS

| | | | | |
|---|---|---|---|---|
| 2,542,016 A | * | 2/1951 | Else ........................ | H02K 9/24 |
| | | | | 415/199.1 |
| 2,736,826 A | * | 2/1956 | Hoover .................... | H02K 9/24 |
| | | | | 416/93 R |
| 10,855,145 B2 | * | 12/2020 | Andersson ............. | H02K 7/006 |
| 11,277,049 B2 | * | 3/2022 | Sakamoto ............... | G03G 15/80 |
| 2013/0078021 A1 | | 3/2013 | Sakamoto et al. | |
| 2014/0312819 A1 | | 10/2014 | Murata et al. | |
| 2016/0265624 A1 | | 9/2016 | Sugita et al. | |
| 2020/0244135 A1 | | 7/2020 | Sakamoto | |
| 2021/0103238 A1 | | 4/2021 | Sakamoto | |

FOREIGN PATENT DOCUMENTS

| | | | |
|---|---|---|---|
| JP | 2009-069596 | | 4/2009 |
| JP | 2009069596 A | * | 4/2009 |
| JP | 2015-087627 | | 5/2015 |
| JP | 2020-124009 | | 8/2020 |
| KR | 2001096222 A | * | 11/2001 |

\* cited by examiner

*Primary Examiner* — Robert B Beatty
(74) *Attorney, Agent, or Firm* — Duft & Bornsen, PC (57) ABSTRACT

An electrical apparatus includes a housing, a blower, and a duct. The housing covers a plurality of electrical components. The blower blows air. The duct guides the air that has cooled one of the plurality of electrical components to another one of the plurality of electrical components. The duct includes a fire wall.

20 Claims, 9 Drawing Sheets

ELECTRICAL APPARATUS WITH A DUCT HAVING A FIRE WALL

CROSS-REFERENCE TO RELATED APPLICATIONS

This patent application is based on and claims priority pursuant to 35 U.S.C. § 119(a) to Japanese Patent Application No. 2021-042907, filed on Mar. 16, 2021, in the Japan Patent Office, the entire disclosure of which is hereby incorporated by reference herein.

BACKGROUND

Technical Field

Embodiments of the present disclosure relate to an electrical apparatus and an image forming apparatus.

Related Art

An electrical apparatus has been proposed that includes a housing for covering a plurality of electrical components, a blower for blowing air, and a duct for guiding air which cools any one of the multiple electrical components to another electrical apparatus.

The electrical apparatus includes a duct for guiding air that cools a drive motor, which is an electrical apparatus, to an electromagnetic clutch, which is another electrical apparatus.

SUMMARY

In an embodiment of the present disclosure, an electrical apparatus includes a housing, a blower, and a duct. The housing covers a plurality of electrical components. The blower blows air. The duct guides the air that has cooled one of the plurality of electrical components to another one of the plurality of electrical components. The duct includes a fire wall.

In another embodiment of the present disclosure, an image forming apparatus includes an electrical apparatus.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

An electrophotographic printer, which may be referred to simply as a printer in the following description, that forms an image by electrophotographic method is described as an image forming apparatus according to embodiments of the present disclosure.

Firstly, a description is given of a basic configuration of the printer according to embodiments of the present disclosure. The image forming apparatus according to an embodiment of the present disclosure is described as an electrophotographic image forming apparatus. However, no limitation is indicated thereby, and the image forming apparatus according to an embodiment of the present disclosure can also be applied to, for example, an image forming apparatus using an inkjet method or an image forming apparatus using a stencil or mimeographic printing method.

Figure 1:
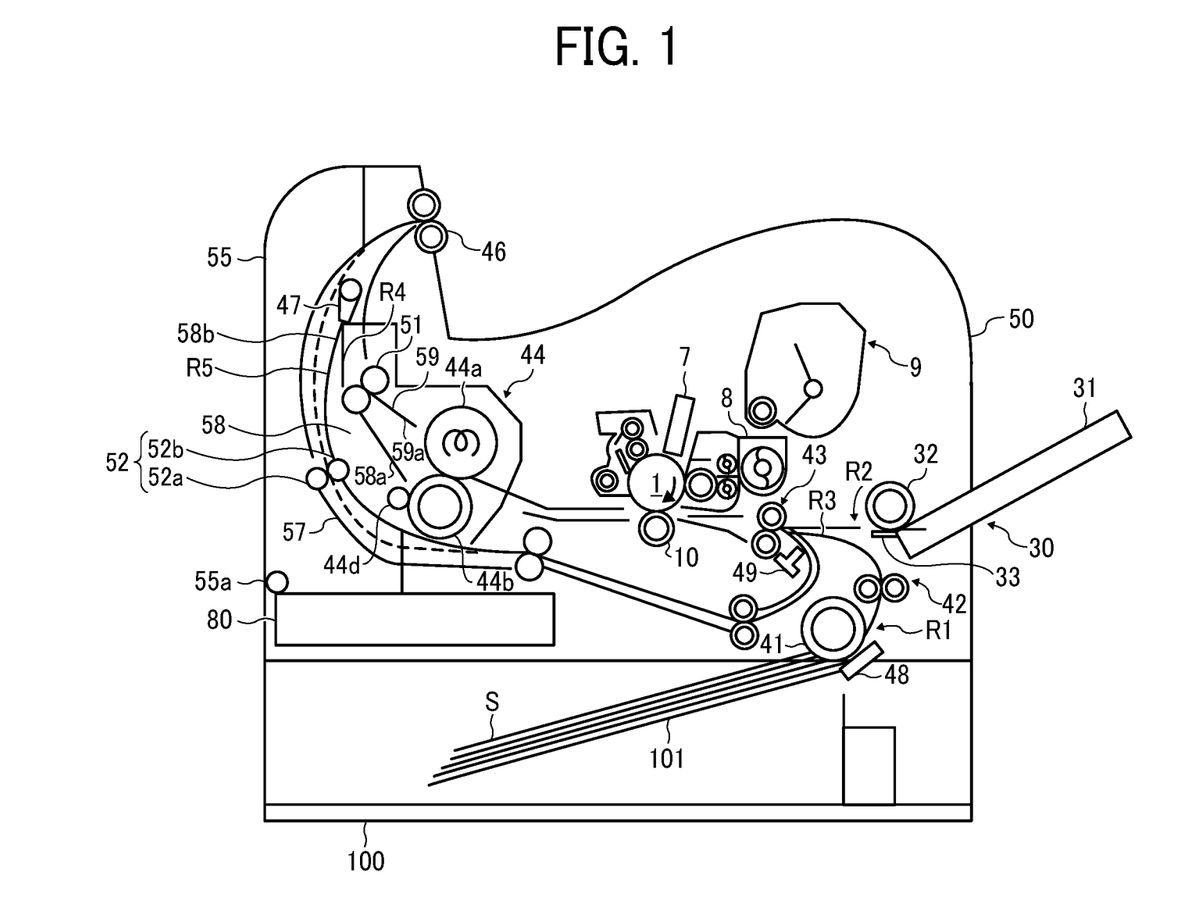
FIG. 1 is a schematic view of a printer according to an embodiment of the present disclosure.

FIG. 1 is a schematic view of a printer according to the present embodiment.

In FIG. 1, the printer includes, for example, a housing 50, a photoconductor 1, and a sheet tray 100. The photoconductor 1 functions as a latent image bearer. The sheet tray 100 functions as a sheet container that is detachably attached to the housing 50. The sheet tray 100 accommodates a plurality of recording sheets S in a sheet bundle.

Each of the multiple recording sheets S accommodated in the sheet tray 100 is fed from the sheet tray 100 as a regular sheet feeding roller 41 is driven to rotate. An uppermost recording sheet S alone is separated from the other recording sheets S in a sheet separation nip formed between the regular sheet feeding roller 41 and a sheet separation pad 48. The uppermost recording sheet S is continuously conveyed and reaches a regular conveyance path R1 that functions as a first conveyance path. Subsequently, the recording sheet S is gripped and sandwiched in a sheet conveyance nip formed by a pair of relay rollers 42 that functions as a pair of upper conveyance rollers, so that the recording sheet S is conveyed from upstream toward downstream in a sheet conveyance direction in the regular conveyance path R1. Note that at least one of the pair of conveyance rollers may be a conveyor belt.

A downstream end of the regular conveyance path R1 communicates with a common conveyance path R3. A registration roller pair 43 is arranged in the common conveyance path R3. A registration sensor 49 that detects the recording sheet S is disposed in the common conveyance path R3, upstream from the registration roller pair 43 in the sheet conveyance direction. When a leading end of the recording sheet S reaches a nip of the registration roller pair 43, conveyance of the recording sheet S is stopped temporality in a state in which the leading end of the recording sheet S is in contact with the nip of the registration roller pair 43 that is stopped. While the leading end of the recording sheet S is in contact with the nip of the registration roller pair 43, skew of the recording sheet S is corrected. The registration sensor 49 is also used for, for example, an initial operation of the printer, or an operation to confirm if there is a remaining sheet when the abnormal stop of the printer is canceled.

The registration roller pair 43 starts rotating when a toner image on the surface of the photoconductor 1 is overlayed onto the recording sheet S in a transfer nip. Then, the recording sheet S is conveyed toward the transfer nip. At this time, the pair of relay rollers 42 starts rotating simultaneously with the start of rotation of the registration roller pair 43, so as to start conveyance of the recording sheet S that has been temporarily stopped at the registration roller pair 43.

The printer includes a bypass sheet feeder 30 as a bypass sheet feeder in the housing 50. The bypass sheet feeder 30 includes, for example, a bypass sheet tray 31, a bypass sheet feed roller 32, and a sheet separation pad 33. The recording sheet S placed on the bypass sheet tray 31 of the bypass sheet feeder 30 is fed from the bypass sheet tray 31 along with rotation of the bypass sheet feed roller 32 to a bypass conveyance path R2 that functions as a second conveyance path. A downstream end of the bypass conveyance path R2 and the downstream end of the regular conveyance path R1 join a common conveyance path R3. The recording sheet S fed out by the bypass sheet feed roller 32 passes a sheet separation nip formed by the bypass sheet feed roller 32 and the sheet separation pad 33 contacting each other in the bypass conveyance path R2. Then, the recording sheet S is conveyed to the common conveyance path R3 to be conveyed to the registration roller pair 43. Thereafter, the recording sheet S is sent to the transfer nip after passing through the registration roller pair 43 in a similar manner to the recording sheet S sent out from the sheet tray 100.

Figure 2:
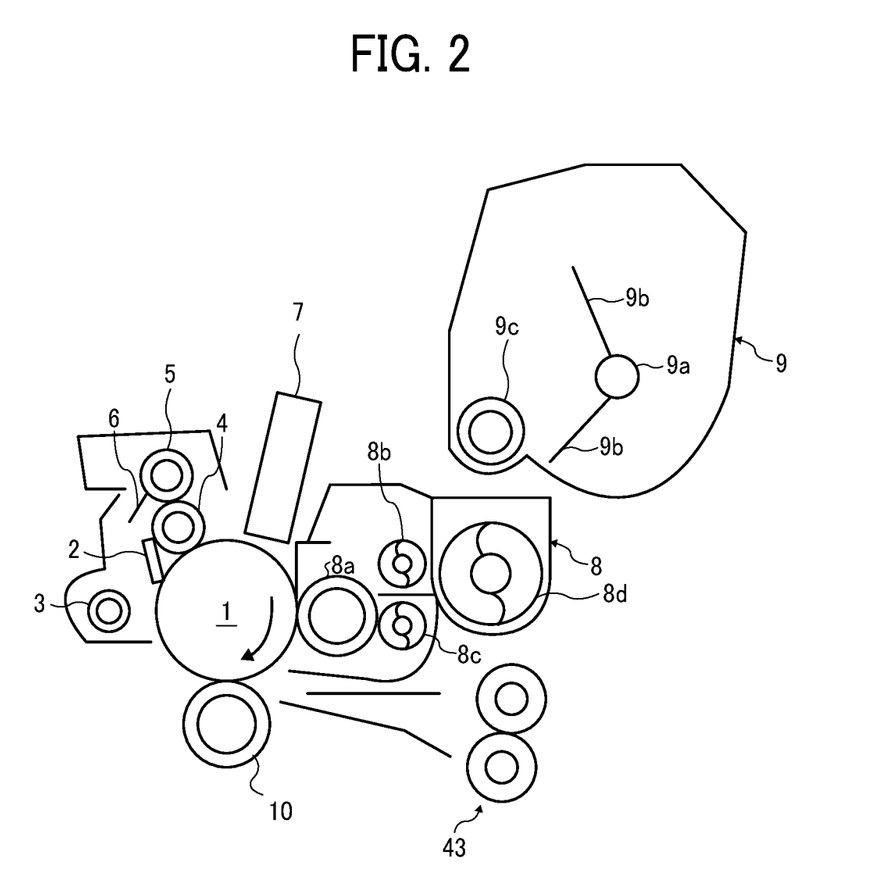
FIG. 2 is an enlarged schematic view of an image forming mechanism including a photoconductor and image forming units disposed around the photoconductor provided for the printer of FIG. 1.

FIG. 2 an enlarged schematic view of an image forming mechanism including the photoconductor 1 and image forming units disposed around the photoconductor 1 provided for the printer.

A cleaning blade 2, a toner collection screw 3, a charging roller 4, a charging roller cleaning roller 5, a scraper 6, a latent image writing device 7, a developing device 8, and a transfer roller 10 are disposed as the image forming units around the drum-shaped photoconductor 1 which is rotated in a clockwise direction in FIG. 2. The charging roller 4 includes a conductive rubber roller and forms a charging nip by rotating while contacting the photoconductor 1. The charging roller 4 is applied with a charging bias that is output from a power source for the charging roller 4. Accordingly, the surface of the photoconductor 1 is uniformly charged by the charging bias generated between the surface of the photoconductor 1 and the surface of the charging roller 4 in the charging nip.

The latent image writing device 7 includes an LED (light-emitting diode) array and performs optical data writing with LED light over the surface of the photoconductor 1 that has been uniformly charged. As the latent image writing device 7 emits the LED light onto the uniformly charged surface of the photoconductor 1, the electric potential of the irradiated region of the charged surface of the photoconductor 1 attenuates. Accordingly, an electrostatic latent image is formed on the irradiated region of the surface of the photoconductor 1.

As the photoconductor 1 rotates, the electrostatic latent image passes through a development region that is formed between the surface of the photoconductor 1 and the developing device 8 when the photoconductor 1 is brought to face the developing device 8. The developing device 8 includes a developer circulation conveyor and a developing unit. The developer circulation conveyor includes developer that contains non-magnetic toner and magnetic carriers. The developer circulation conveyor includes a first screw 8b for conveying the developer to be supplied to a developing roller 8a, and a second screw 8c for conveying the developer in an independent space positioned immediately below the first screw 8b. The developer circulation conveyor further includes an inclined screw 8d for receiving the developer from the second screw 8c and supplying the developer to the first screw 8b. The developing roller 8a, the first screw 8b, and the second screw 8c are placed at attitudes parallel with each other. By contrast, the inclined screw 8d is placed at an attitude inclined with respect to the developing roller 8a, the first screw 8b, and the second screw 8c.

The first screw 8b rotates to convey the developer from a far side toward a near side in a direction orthogonal to the surface of the paper on which FIG. 2 is drawn. At this time, the first screw 8b supplies a portion of the developer to the developing roller 8a that is disposed facing the first screw 8b. The developer having been conveyed by the first screw 8b to the vicinity of a far end portion of the first screw 8b in the direction orthogonal to the surface of the paper on which FIG. 2 is drawn is dropped onto the second screw 8c.

While receiving used developer from the developing roller 8a, the second screw 8c rotates to convey the received developer from the far side toward the near side in the direction orthogonal to the surface of the paper on which FIG. 2 is drawn, along with rotation of the second screw 8c. The developer conveyed by the second screw 8c to the vicinity of a near end portion of the second screw 8c in the direction orthogonal to the surface of the paper on which FIG. 2 is drawn, is supplied to the inclined screw 8d. Further, along with rotation of the inclined screw 8d, the developer is conveyed from the far side toward the near side in the direction orthogonal to the surface of the paper on which FIG. 2 is drawn. Thereafter, the developer is supplied to the first screw 8b in the vicinity of the far end portion of the first screw 8b in the direction orthogonal to the surface of the paper on which FIG. 2 is drawn.

The developing roller 8a includes a developing sleeve and a magnet roller. The developing sleeve is a tubular-shaped rotatable non-magnetic member. The magnet roller is fixed to the developing sleeve in such a way as not to rotate together with the developing sleeve. A part of the developer that is conveyed by the first screw 8*b* is scooped up by the surface of the developing sleeve due to magnetic force generated by the magnet roller. The developer, which has been borne on the surface of the developing sleeve, is conveyed along with rotation of the developing sleeve. The thickness of a layer of the developer on the surface of the developing sleeve is regulated while the developer passes through a position at which the developing sleeve and a doctor blade are disposed facing each other. Subsequently, the developer is conveyed while sliding on the surface of the photoconductor 1 in a development region between the developing roller 8*a* and the photoconductor 1.

A development bias having a same polarity as toner and as a uniformly charged electric potential, which is a background electric potential, on the surface of the photoconductor 1 is applied to the developing sleeve. The absolute value of this development bias is greater than the absolute value of the electric potential of the latent image and is smaller than the absolute value of the background electric potential on the background surface of the photoconductor 1. Accordingly, in the development region, a development potential acts between the electrostatic latent image formed on the photoconductor 1 and the developing sleeve of the developing device 8, so as to electrostatically move toner from the developing sleeve to the electrostatic latent image on the surface of the photoconductor 1. By contrast, a background potential acts between the background surface of the photoconductor 1 and the development sleeve of the developing device 8, so as to electrostatically move toner from the photoconductor 1 to the developing sleeve. This action of the background potential causes toner to selectively adhere to the electrostatic latent image formed on the surface of the photoconductor 1, so that the electrostatic latent image is developed in the development region.

The developer that has passed through the development region enters a region in which the developing sleeve faces the second screw 8*c* as the developing sleeve rotates. In the above-described region, a repulsive magnetic field is formed by two magnetic poles having a same polarity out of multiple magnetic poles included in the magnet roller. The developer that has entered the above-described region is separated from the surface of the developing sleeve due to the effect of the repulsive magnetic field and is collected by the second screw 8*c*.

The developer that is conveyed by the inclined screw 8*d* contains the developer that has been collected from the developing roller 8*a*, and this collected developer contributes to development in the development region. Accordingly, toner concentration is lowered. The developing device 8 includes a toner concentration sensor that detects toner concentration of the developer to be conveyed by the inclined screw 8*d*. Based on detection results obtained by the toner concentration sensor, a controller 80, which functions as circuitry that includes semiconductor circuits such as a central processing unit (CPU), outputs a replenishment operation signal for replenishing toner to the developer that is conveyed by the inclined screw 8*d*, as needed.

A toner cartridge 9 is disposed above the developing device 8. The toner cartridge 9 contains toner and agitates the toner with agitators 9*b* fixed to a rotary shaft 9*a*. Further, a toner replenishment member 9*c* is driven to rotate according to the replenishment operation signal output from the controller 80. With this operation, an amount of toner corresponding to an amount of rotation of the toner replenishment member 9*c* is replenished to the inclined screw 8*d* of the developing device 8.

A toner image that has been formed on the surface of the photoconductor 1 as a result of the development enters the transfer nip at which the photoconductor 1 and the transfer roller 10 contact each other along with rotation of the photoconductor 1. An electric bias having the opposite polarity to the electric potential of the latent image formed on the photoconductor 1 is applied to the transfer roller 10. Accordingly, a transfer bias is formed within the transfer nip.

As described above, the registration roller pair 43 conveys the recording sheet S toward the transfer nip in synchrony with a timing at which toner image formed on the photoconductor 1 is overlaid onto the recording sheet S in the transfer nip. Due to the transfer bias and the nip pressure, as the recording sheet S is brought to closely contact with the toner image formed on the photoconductor 1 at the transfer nip, the toner image on the photoconductor 1 is transferred onto the recording sheet S.

Residual toner that has not been transferred onto the recording sheet S remains on the surface of the photoconductor 1 after the recording sheet S with the toner image has passed through the transfer nip. After being scraped off from the surface of the photoconductor 1 by the cleaning blade 2 that is in contact with the photoconductor 1, the residual toner is conveyed by the toner collection screw 3, toward a waste toner bottle.

The surface of the photoconductor 1 that is cleaned by the cleaning blade 2 is electrically discharged by an electric discharger. Thereafter, the surface of the photoconductor 1 is uniformly charged again by the charging roller 4. Foreign materials such as toner additive agents and toner that has not been removed by the cleaning blade 2 remain on the charging roller 4 that is in contact with the surface of the photoconductor 1. These foreign materials are shifted to the charging roller cleaning roller 5 that is in contact with the charging roller 4, and then are scraped off from the surface of the charging roller cleaning roller 5 by the scraper 6 that is in contact with the charging roller cleaning roller 5. The foreign materials scraped off from the surface of the charging roller cleaning roller 5 fall onto the above-described toner collection screw 3.

In FIG. 1, the recording sheet S, which has passed through the transfer nip formed by the photoconductor 1 and the transfer roller 10 contacting each other, is conveyed to a fixing device 44. The fixing device 44 includes a fixing roller 44*a* and a pressure roller 44*b*. The fixing roller 44*a* includes a heat generating source such as a halogen lamp. The pressure roller 44*b* is pressed against the fixing roller 44*a*. The fixing roller 44*a* and the pressure roller 44*b* contact each other to form a fixing nip. A toner image is fixed to the surface of the recording sheet S that is held in the fixing nip due to application of heat and pressure. Thereafter, the recording sheet S that has passed through the fixing device 44 passes through a sheet ejection path R4. Then, the recording sheet S is held in a sheet ejection nip formed by a pair of sheet ejection rollers 46.

The printer switches printing modes between a simplex printing mode for performing simplex printing and a duplex printing mode for performing duplex printing. In the simplex printing mode, the printer produces an image on one side of the recording sheet S. By contrast, the printer prints respective images on both sides of the recording sheet S in the duplex printing mode. In the simplex printing mode or in the duplex printing mode in which images have been formed on both sides of the recording sheet S, the pair of sheet ejection rollers 46 continues rotating in a forward direction to eject the recording sheet S in the sheet ejection path R4 out of the printer. After passing through the fixing device 44, the recording sheet S is stacked on a sheet stacker disposed on the top face of the housing 50 of the printer.

By contrast, in the duplex printing mode when an image is formed on only one side of the recording sheet S, the pair of sheet ejection rollers 46 is rotated in a reverse direction at a timing at which a trailing end of the recording sheet S enters the sheet ejection nip of the pair of sheet ejection rollers 46. At this time, a switching claw 47 disposed in the vicinity of a downstream end of the sheet ejection path R4 moves to block and close the sheet ejection path R4 and open an entrance of a reverse conveyance path R5 at the same time. As the recording sheet S starts reversing by the reverse rotation of the pair of sheet ejection rollers 46, the recording sheet S is conveyed to the reverse conveyance path R5. A downstream end of the reverse conveyance path R5 meets the common conveyance path R3 on an upstream side from the registration roller pair 43 in the sheet conveyance direction. After being conveyed in the reverse conveyance path R5, the recording sheet S is conveyed to the registration roller pair 43 in the common conveyance path R3 again. Then, after a toner image has been formed on the other side of the recording sheet S in the transfer nip, the recording sheet S passes through the fixing device 44, the sheet ejection path R4, and the pair of sheet ejection rollers 46 and is then ejected to the outside of the housing 50 of the printer.

The fixing device 44 that functions as a fixing device of the present embodiment includes a cleaning roller 44d. The cleaning roller 44d functions as a contact-separation member to remove adhered substances such as toner or paper dust adhered to the surface of the pressure roller 44b as a contact-separation target member. In other words, the cleaning roller 44d contacts and separates from the pressure roller 44b by a contact-separation mechanism to be described below.

Further, the fixing device 44 also includes members that are disposed between the fixing nip in the sheet ejection path R4 to the switching claw 47. More specifically, the fixing device 44 includes a sheet ejection guide 59, a sheet ejection reverse guide 58, and a pair of relay conveyance rollers 51. The sheet ejection guide 59 is disposed facing a surface of the recording sheet S that has passed through the fixing nip and contacts the fixing roller 44a. The sheet ejection guide 59 includes a guide portion 59a for guiding the recording sheet S to the switching claw 47. The sheet ejection reverse guide 58 includes a sheet ejection guide 58a and a sheet reversal guide 58b. The sheet ejection guide 58a is disposed facing a surface of the recording sheet S that has passed through the fixing nip and contacts the pressure roller 44b. The sheet ejection guide 58a guides the recording sheet S to the switching claw 47. The sheet reversal guide 58b is disposed facing a surface of the recording sheet S that has passed through the switching claw 47 in the reverse conveyance path R5 to guide the recording sheet S. A driven roller 52b of a reverse conveyance roller pair 52 for conveying the recording sheet S in the reverse conveyance path R5 is also attached to the sheet ejection reverse guide 58.

Further, an opening and closing cover 55 is disposed on a left side surface of the housing 50 of the printer. The opening and closing cover 55 includes a reverse guide 57 which faces a surface of the recording sheet S on which an image is not to be formed in the reverse conveyance path R5 for guiding the recording sheet S. A drive roller 52a of the reverse conveyance roller pair 52 is attached to the reverse guide 57.

Figure 3:
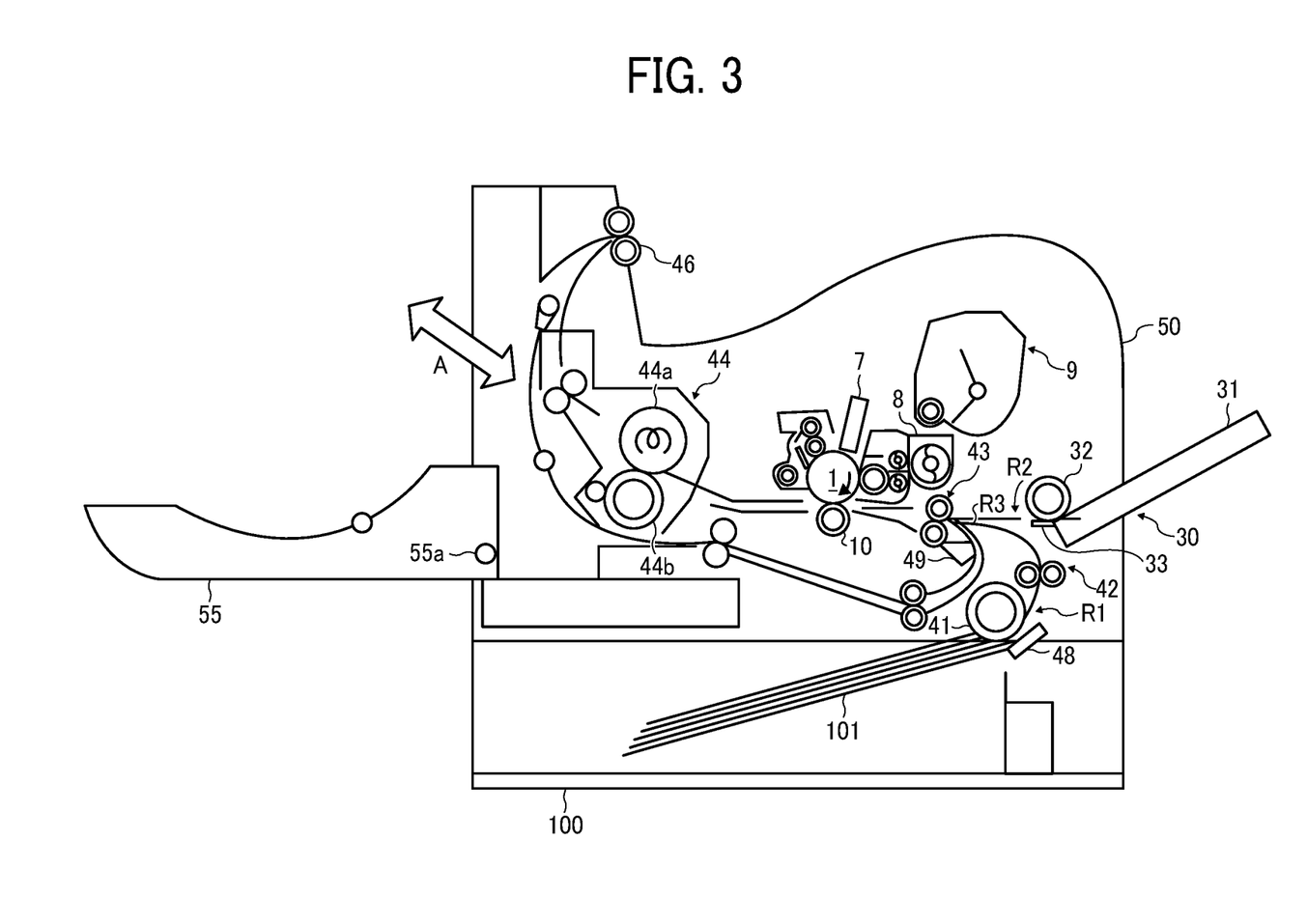
FIG. 3 is a schematic view of the printer of FIG. 1, where an opening and closing cover is opened.

FIG. 3 is a schematic view of the printer in which the opening and closing cover 55 is opened.

When the opening and closing cover 55 opens, the fixing device 44 is exposed. Thus, the fixing device 44 can be detached from and attached to the housing 50 of the printer in a direction indicated by arrow A in FIG. 3.

Next, a drive device 60 that serves as an electrical apparatus is described.

Figure 4:
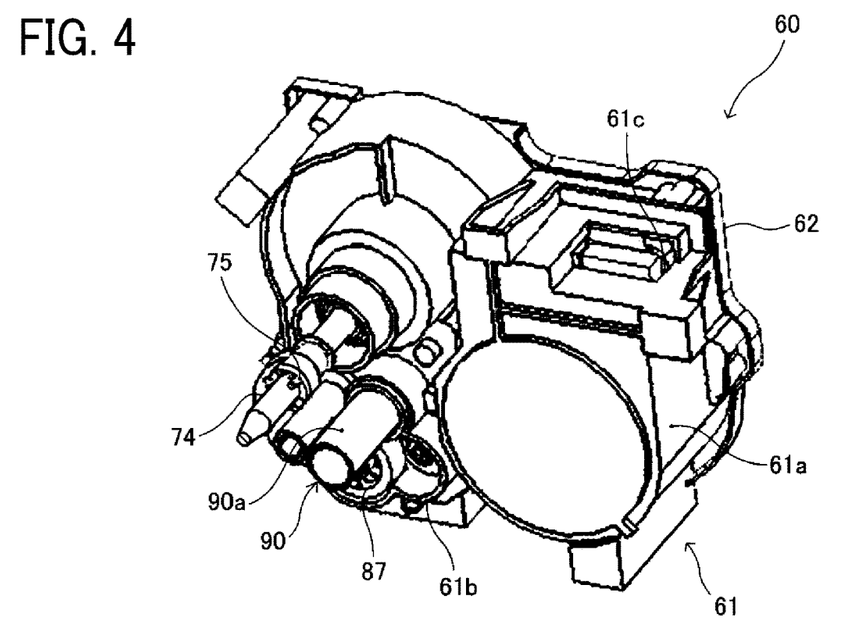
FIG. 4 is a schematic perspective view of a drive device according to an embodiment of the present disclosure.

FIG. 4 is a perspective view of the drive device 60 according to the present embodiment.

The drive device 60 transmits the driving force of the drive motor 63 to the photoconductor 1, the developing device 8, the registration roller pair 43, and the regular sheet feeding roller 41.

The drive device 60 includes a resin housing 61 made of flame-retardant resin and a mounting plate 62. The resin housing 61 includes a motor housing 61a for covering the drive motor 63 (see FIG. 5) and a gear housing 61b for covering a gear.

An opening 61c is formed in an upper portion of the motor housing 61a to take in air when the drive motor 63 is air-cooled and to pass through a harness connecting the drive motor 63 with the controller 80 and a power supply unit.

A photoconductor drive shaft 74, the tip of which is inserted into the photoconductor 1, and a coupling portion 90a of a development drive transmission member 90 pass through the gear housing 61b. A photoconductor coupling 75 is attached to the photoconductor drive shaft 74 so as to be engaged with a flange portion of the photoconductor 1 and transmits a driving force to the photoconductor 1.

A registration output gear 87 in FIG. 4 outputs a driving force of the drive motor 63 to the registration roller pair 43.

Figure 5:
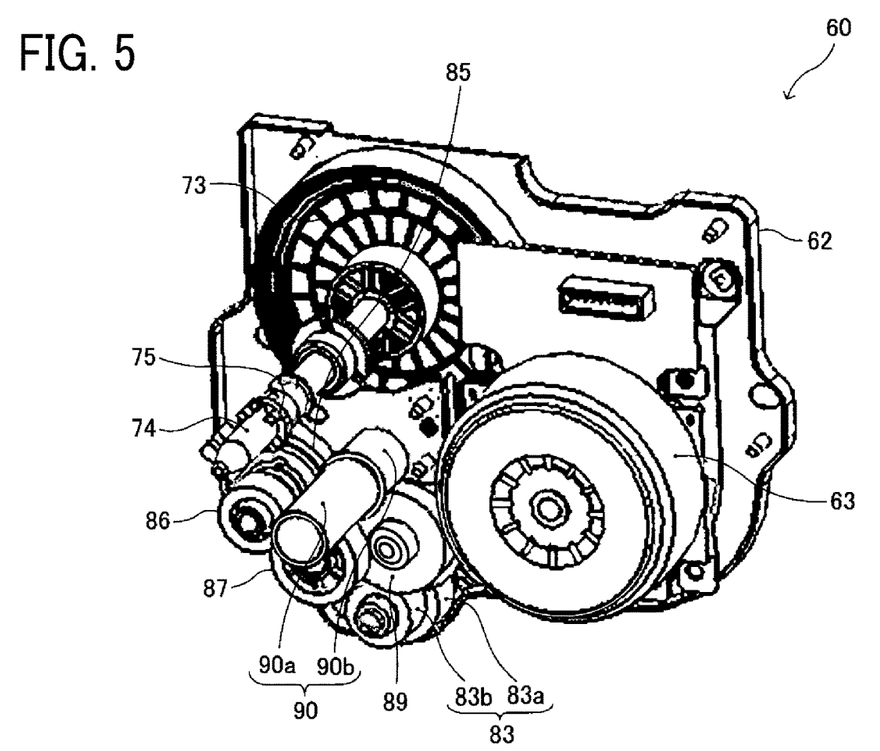
FIG. 5 is a schematic perspective view of the drive device of FIG. 4 from which a resin housing is removed.

FIG. 5 is a perspective view of the drive device 60 from which the resin housing 61 is removed, according to the present embodiment.

Figure 6:
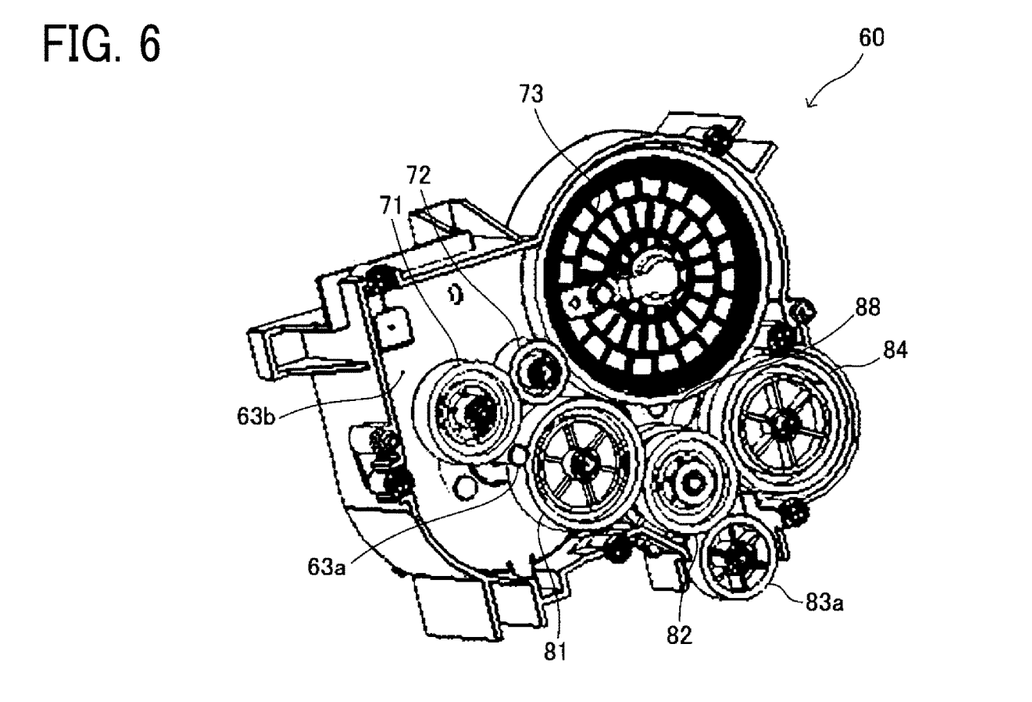
FIG. 6 is a perspective view of the drive device of FIG. 4 from which a mounting metal plate is removed, as viewed from a side of the mounting metal plate.

FIG. 6 is a perspective view of the drive device 60 from which the mounting plate 62 is removed as viewed from a side of the mounting plate 62, according to the present embodiment.

As illustrated in FIG. 6, a first input gear 71 and a second input gear 81 mesh with a motor gear disposed directly on a motor shaft 63a of the drive motor 63 that serves as an electrical apparatus. An idler gear 72 meshes with the first input gear 71, and a photoconductor gear 73 meshes with the idler gear 72. As illustrated in FIG. 5, the photoconductor gear 73 is attached to the photoconductor drive shaft 74.

The first input gear 71, the second input gear 81, and the idler gear 72 are disposed between the mounting plate 62 and a motor bracket 63b made of sheet metal.

A branch gear 82 meshes with the second input gear 81, and a first sheet feed gear 83a of a sheet feed conveyance gear 83 and a registration first gear 84 mesh with the branch gear 82. Further, a development electromagnetic clutch 88 as an electrical apparatus and a development first gear 89 (see FIG. 5) are provided coaxially with the branch gear 82. The branch gear 82 transmits a driving force to the development first gear 89 via the development electromagnetic clutch 88. The development first gear 89 meshes with a development gear 90b of the development drive transmission member 90.

The sheet feed conveyance gear 83 includes the first sheet feed gear 83a and a second sheet feed gear 83b. The second sheet feed gear 83b transmits the driving force of the drive motor 63 to a sheet feed conveyance drive transmission mechanism for transmitting the driving force to the regular sheet feeding roller 41.

A registration electromagnetic clutch 85 (see FIG. 5) as an electrical apparatus and a registration second gear 86 (see FIG. 5) are provided coaxially with the registration first gear 84. The registration first gear 84 transmits a driving force to the registration second gear 86 via the registration electromagnetic clutch 85. The registration second gear 86 meshes with the registration output gear 87 that outputs the driving force of the drive motor 63 to the registration roller pair 43.

The drive motor 63, the development electromagnetic clutch 88, and the registration electromagnetic clutch 85, which are electrical apparatuses, generate heat during driving. When the drive motor 63 is driven, a coil provided for the drive motor 63 generates heat. When the registration electromagnetic clutch 85 and the development electromagnetic clutch 88 are turned on to generate electromagnetic force, each coil provided for registration electromagnetic clutch 85 and the development electromagnetic clutch 88 generates heat.

In the drive device 60, the drive motor 63, the development electromagnetic clutch 88, and the registration electromagnetic clutch 85 are housed in a space surrounded by the resin housing 61 and the mounting plate 62. Accordingly, heat generated when the drive motor 63, the development electromagnetic clutch 88, and the registration electromagnetic clutch 85 are driven is trapped in the space surrounded by the resin housing 61 and the mounting plate 62. The registration electromagnetic clutch 85 is turned on only when the recording sheet S is conveyed to the transfer nip and is coupled by driving, the amount of heat generated is not so large. Accordingly, the temperature increase is not likely to be large. However, the drive motor 63 is always driven during the image forming operation. Accordingly, the amount of heat generated is large and the temperature is likely to rise. Further, the development electromagnetic clutch 88 is also substantially driven and coupled during the image forming operation. Accordingly, the amount of heat generated is large and the temperature is likely to rise.

For this reason, the drive device 60 air-cools the drive motor 63 and the development electromagnetic clutch 88.

Figure 7:
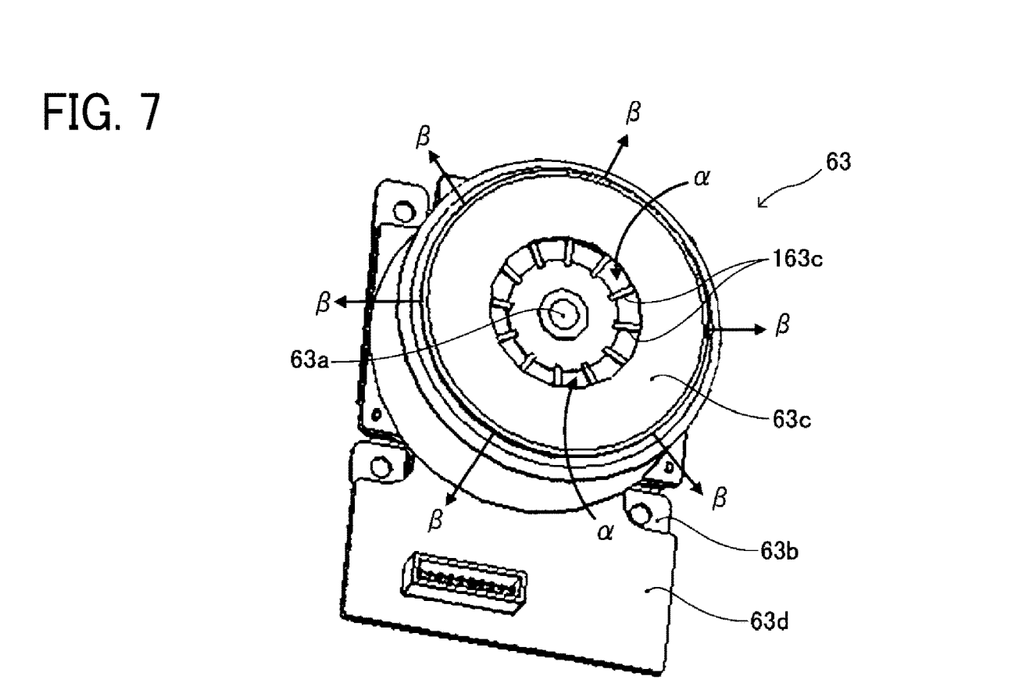
FIG. 7 is a perspective view of a drive motor according to an embodiment of the present disclosure.

FIG. 7 is a perspective view of the drive motor 63, according to the present embodiment.

As illustrated in FIG. 7, a self-cooling fan 63c as a blower is coaxially provided with the motor shaft 63a of the drive motor 63. When the drive motor 63 is driven to rotate the motor shaft 63a, air is taken in through the opening 61c of the motor housing 61a illustrated in FIG. 1. The air that is taken in is blown between a rotor and the self-cooling fan 63c by blades 163c of the self-cooling fan 63c, as indicated by arrows $\alpha$ in FIG. 7. Thus, the rotor is air-cooled. Air obtained by air-cooling the rotor is discharged in a normal-line direction from between the rotor and the self-cooling fan 63c, as indicated by arrows $\beta$ in FIG. 7.

Figure 8A:
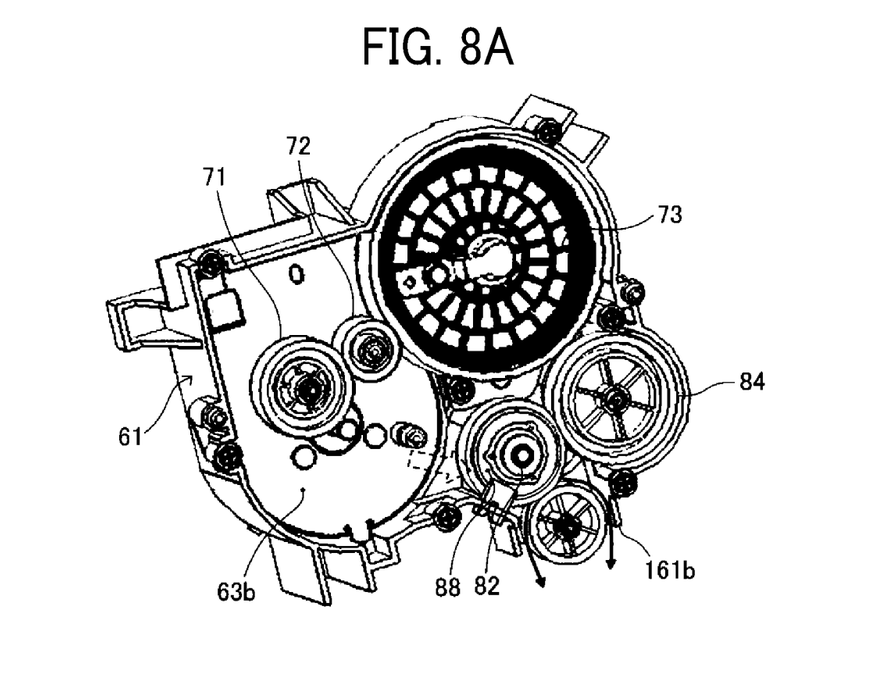
FIG. 8A is a perspective view of a drive motor, illustrating the air flow after the drive motor is air-cooled, according to an embodiment of the present disclosure.
Figure 8B:
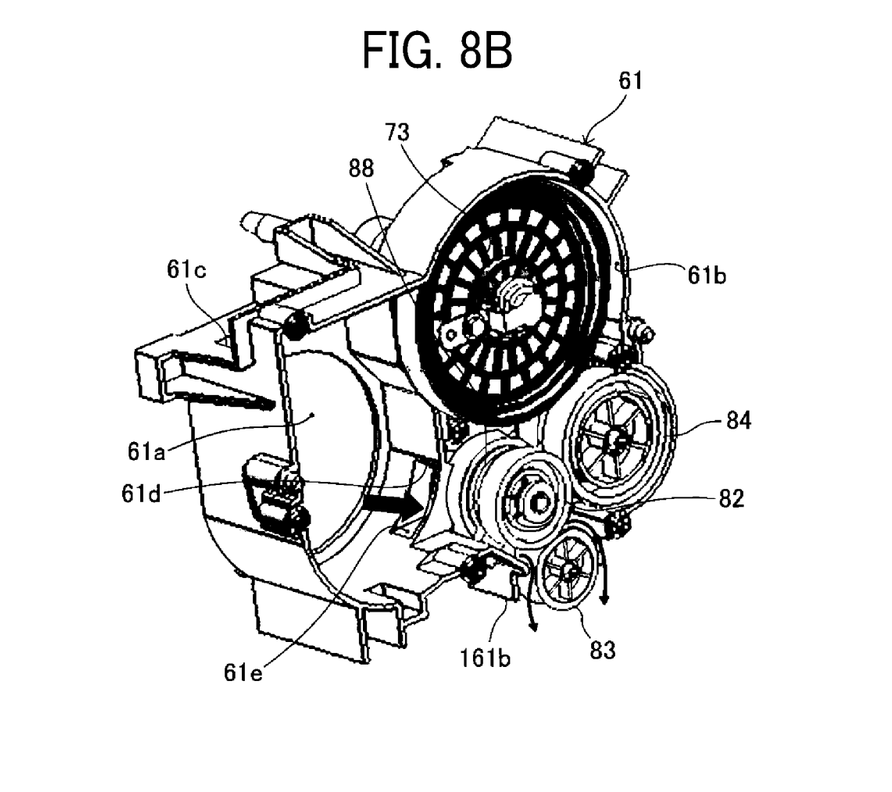
FIG. 8B is another perspective view of a drive motor, illustrating the air flow after the drive motor is air-cooled, according to an embodiment of the present disclosure.

FIG. 8A is a perspective view of the drive device 60, illustrating air flow after the drive motor 63 is air-cooled, according to the present embodiment. FIG. 8B is another perspective view of the drive device 60, illustrating air flow after the drive motor 63 is air-cooled, according to the present embodiment.

FIG. 8A is a perspective view of the drive device 60 in which the second input gear 81 disposed opposite the motor bracket 63b of the drive motor 63 is removed from the configuration illustrated in FIG. 6. FIG. 8B is a perspective view of the drive device 60 in which the drive motor 63, the first input gear 71, and the idler gear 72 are removed from the configuration illustrated in FIG. 8A.

As illustrated in FIG. 8B, an intake port 61d that communicates with the duct 61e is opened in the motor housing 61a of the resin housing 61. The air that air-cools the rotor and discharged in the normal-line direction from between the rotor and the self-cooling fan 63c flows from the intake port 61d into the duct 61e surrounded by four sides. After the air flows through the duct 61e, the air flows into the development electromagnetic clutch 88 from an exhaust port 61f (see FIG. 10) of the duct 61e and air-cools the development electromagnetic clutch 88. The air cooling the development electromagnetic clutch 88 is discharged from an opening 161b of the gear housing 61b, which is opened so that the second sheet feed gear 83b meshes with the gear of the sheet feed conveyance drive transmission mechanism.

Figure 9:
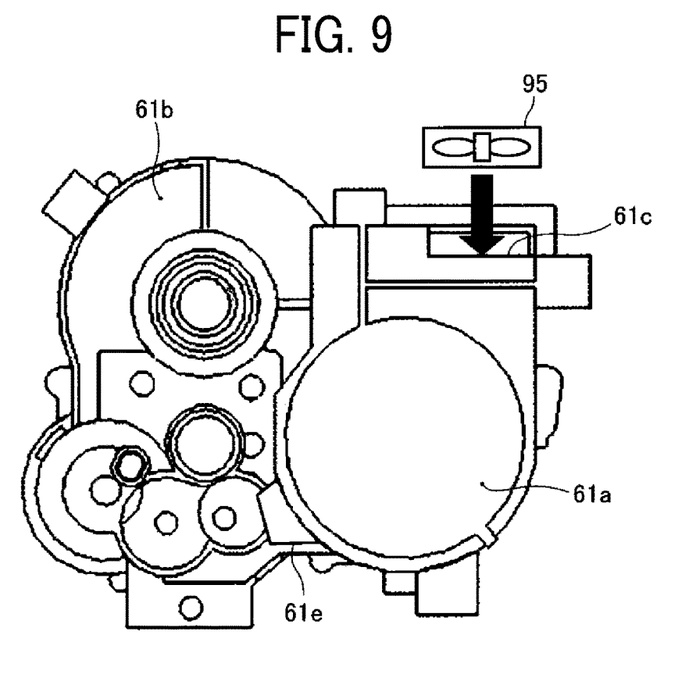
FIG. 9 is a side view of a housing, illustrating how the air is taken into the housing by an external fan, according to an embodiment of the present disclosure.

FIG. 9 is a side view of the housing 61, illustrating how air is taken into the housing by an external fan, according to the present embodiment.

Further, instead of the self-cooling fan 63c, as illustrated in FIG. 9, an external fan 95 that serves as a blower may be disposed, and air may be sent into the motor housing 61a from the opening 61c of the motor housing 61a by the external fan 95. Also, in a configuration illustrated in FIG. 9, air blown by the external fan 95 flows into the motor housing 61a from the opening 61c of the motor housing 61a. Thus, the air cools the drive motor 63. Thereafter, the air flows into the inside of the gear housing 61b through the duct 61e, air-cools the development electromagnetic clutch 88, and then is discharged from the opening 161b of the gear housing 61b.

The number of rotations per minute of the self-cooling fan 63c depends on the number of rotations per minute of a rotating body through which the drive motor 63 transmits the driving force. Accordingly, the flow rate of the air blown by the self-cooling fan 63c may be small. On the other hand, the number of rotations per minute of the external fan can be set without the above-described restriction as desired. Such a configuration as described above allows to secure a flow rate of air sufficient for air-cooling the drive motor 63 and the development electromagnetic clutch 88. Accordingly, the drive motor 63 and the development electromagnetic clutch 88 can be air cooled favorably.

Each of the gears provided for the drive device 60 is made of polyacetal (POM) resin because of excellent properties of mechanical strength, abrasion resistance, and sliding performance. However, the POM resin has a high oxidation index, is often a horizontal burning (HB) material (combustible) according to Underwriters Laboratories (UL) 94 standard and might spread fire.

For example, a capacitor and a driver IC are mounted on a control board 63d (see FIG. 7) of the drive motor 63. For this reason, there is a possibility that the capacitor, the driver IC may catch fire due to a tracking phenomenon. A plurality of measures such as performing control to stop power supply to the drive motor 63 when an excessive current flows, are taken to prevent such an ignition. However, if the capacitor or the driver IC catches fire when such a control fails, flame generated by the fire may spread to the gears formed of the POM resin.

The drive device 60 has a following configuration that prevents the fire from spreading if the capacitor, the driver IC catches fire. In other words, the resin housing 61 is made of flame-retardant resin, and the motor housing 61a of the resin housing 61 and the motor bracket 63b made of sheet metal of the drive motor 63 cover the control board 63d of the drive motor 63.

As described above, the intake port 61d that communicates with the duct 61e is opened in the motor housing 61a of the resin housing 61. For this reason, when, for example, a condenser, or the driver IC ignites, the flame may pass through the duct 61e from the intake port 61d and blow out from the exhaust port 61f of the duct 61e. Thus, the flame may spread to the gears.

For this reason, the drive device 60 includes a fire wall in the duct 61*e* so as to prevent the flame from reaching the exhaust port 61*f*.

Figure 10:
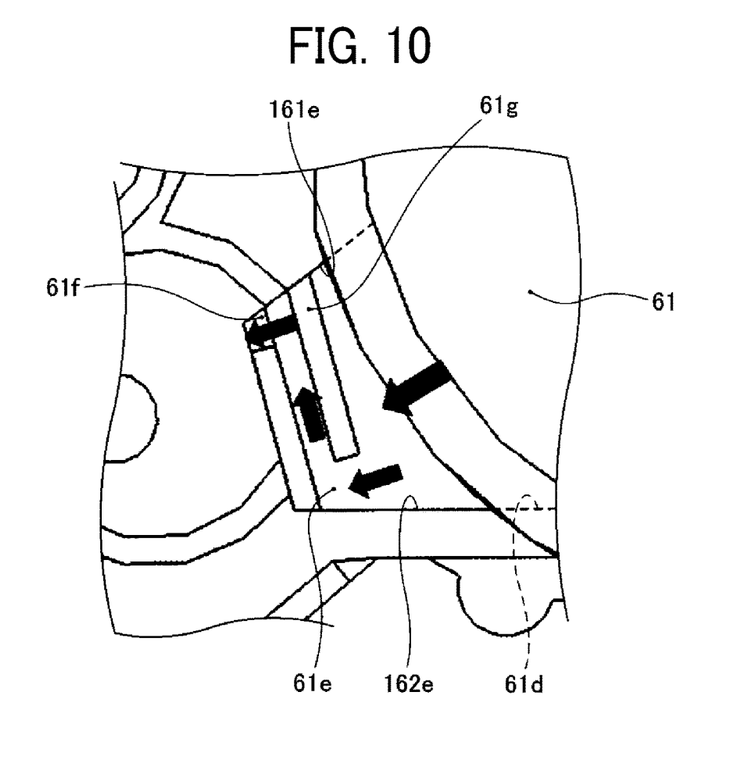
FIG. 10 is a schematic diagram illustrating the structure of a duct provided for the drive device of FIG. 4.

FIG. 10 is a schematic view of the duct 61*e* provided for the drive device 60, according to the present embodiment.

In FIG. 10, the duct 61*e* has a shape opening in a direction perpendicular to a plane on which FIG. 10 is drawn so that the structure inside the duct 61*e* can be easily understood. However, the duct 61*e* has a closed shape except for the intake port 61*d* and the exhaust port 61*f*. Such a shape of the duct 61*e* allows the intake port 61*d* to flow the air flown to the intake port 61*d* to the exhaust port 61*f* without loss, and to prevent the flame blown out from the intake port 61*d* into the duct 61*e* from spreading to other members.

The flow path of the duct 61*e* has a concave shape lower than the circumference of the duct 61*e*. The exhaust port 61*f* of the duct 61*e* is disposed at an end of the duct 61*e* opposite to the intake port 61*d* in an upper portion in FIG. 10. The exhaust port 61*f* has a shape in which a bottom, an upper side, and a left side surface of the exhaust port 61*f* in FIG. 10 are open. The exhaust port 61*f* may have a shape in which only the bottom surface of the exhaust port 61*f* in FIG. 10 is open. The duct 61*e* includes a fire wall 61*g* so as to block the exhaust port 61*f* and the intake port 61*d*. The fire wall 61*g* is formed integrally with the resin housing 61 made of the flame-retardant resin and has flame-retardant properties.

The fire wall 61*g* is disposed substantially in the center of the duct 61*e* and is connected to all side walls forming the flow path of the duct 61*e* except for having a predetermined gap with a wall 162*e* in a lower side in FIG. 10. The duct 61*e* extends downward in FIG. 10 from a wall 161*e* in an upper portion of FIG. 10 and faces the wall 162*e* in the lower portion of FIG. 10 with a predetermined clearance. Such a configuration as described above allows the air that has flown into the duct 61*e* from the intake port 61*d* and has cooled the drive motor 63 to pass through the clearance between the fire wall 61*g* and the lower wall 162*e*. Thereafter, the air moves upward in FIG. 10 to flow from the exhaust port 61*f* to the development electromagnetic clutch 88, as illustrated by arrows in FIG. 10.

Figure 11:
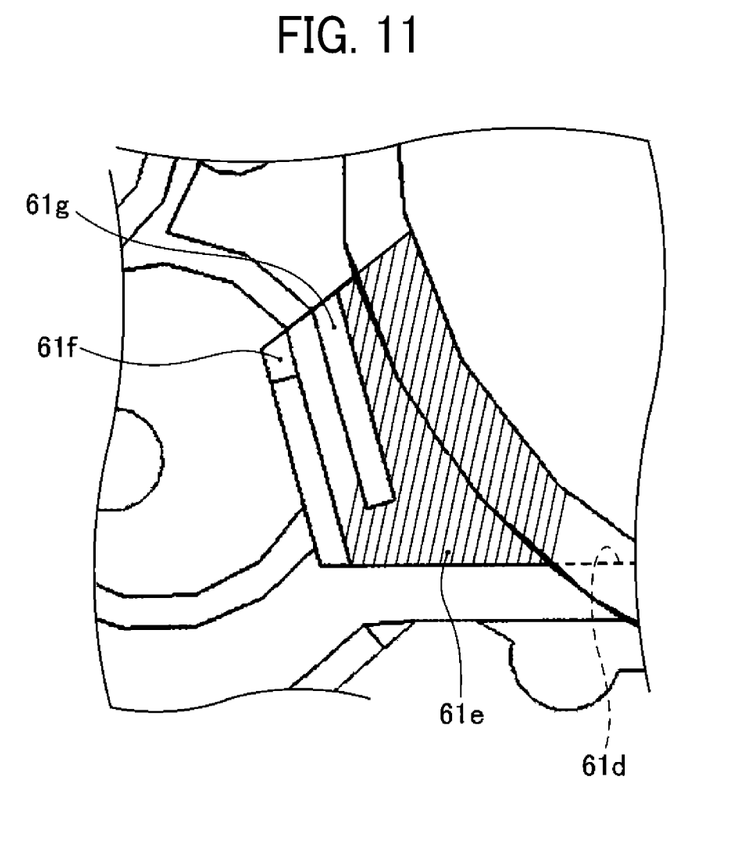
FIG. 11 is a diagram illustrating how the flames grow inside the duct of FIG. 10.

FIG. 11 is a schematic view of the duct 61*e*, illustrating how flame spreads within the duct 61*e*, according to the present embodiment.

A region indicated by diagonal lines illustrated in FIG. 11 indicates a region in which the flame may spread within the duct 61*e*.

In the drive device 60, the exhaust port 61*f* is disposed in an upper portion in FIG. 11 such that the exhaust port 61*f* is positioned to enter a region which is the shadow of the fire wall 61*g* formed when a parallel light perpendicular to the wall surface of the fire wall 61*g* is irradiated from the intake port 61*d*. Accordingly, the flame that has flown into the duct 61*e* from the intake port 61*d* does not directly move to the exhaust port 61*f* and is blocked by the fire wall 61*g*. Such a configuration as described above allows to prevent the flame from reaching the exhaust port 61*f* and from blowing out from the exhaust port 61*f* and from spreading to the gears in the gear housing 61*b*.

The flame blocked by the fire wall 61*g* moves around the fire wall 61*g* from between the fire wall 61*g* and the wall 162*e* below the duct 61*e* in a lower side in FIG. 11. The flame that has moved around the fire wall 61*g* spreads only in a region between a position 10 mm from the tip of the fire wall 61*g* and an angle 30° with the fire wall 61*g*. In the drive device 60, the exhaust port 61*f* is disposed at a position in an upper portion of the duct 61*e* which is farthest from the clearance between the fire wall 61*g* and the wall 162*e* of the duct 61*e* in a lower side of FIG. 11. Accordingly, the flame that has moved around the fire wall 61*g* through between the fire wall 61*g* and the lower wall 162*e* of the duct 61*e* does not reach the exhaust port 61*f*. Such a configuration as described above allows to prevent the flame from blowing out from the exhaust port 61*f* and from spreading to the gears in the gear housing 61*b*.

Figure 12:
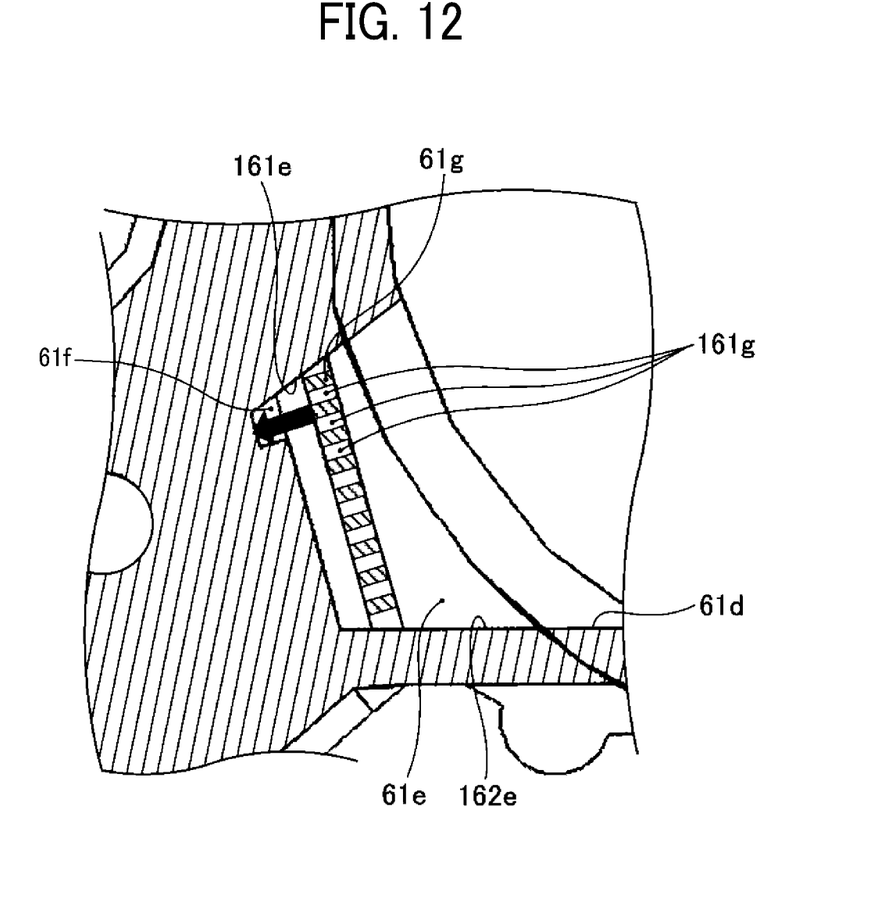
FIG. 12 is a schematic diagram illustrating the structure of a duct according to a modification of an embodiment of the present disclosure.

FIG. 12 is a schematic view of a modification of the duct 61*e* according to the present embodiment.

In the modification illustrated in FIG. 12, a plurality of small holes 161*g* are formed in the fire wall 61*g* so that air can pass through the multiple small holes 161*g*, but flame cannot pass through the multiple small holes 161*g*. The fire wall 61*g* is disposed between the wall 161*e* in an upper side of FIG. 12 and the wall 162*e* in a lower side of FIG. 12 so that the duct 61*e* is partitioned by the fire wall 61*g*. The diameter of each of the multiple small holes 161*g* is equal to or smaller than 3 mm. Accordingly, the flame can be prevented from passing through the multiple small holes 161*g*. Also in the modification, the fire wall 61*g* can block the flame blown out from the intake port 61*d*. Accordingly, the flame can be prevented from blowing out from the exhaust port 61*f* and from spreading to the gears in the gear housing 61*b*.

The shape of each of the small holes 161*g* does not have to be circular in cross-section, and may be, for example, a small hole having a square cross-section equal to or smaller than 3 mm×3 mm. Further, according to the present modification, the multiple small holes 161*g* may not be formed due to reasons related to molding and the fire wall 61*g* may not be integrally formed with the resin housing 61. In such a case, the fire wall 61*g* may be a separate component from the resin housing 61. When the fire wall 61*g* is a separate component from the resin housing 61, preferably that the fire wall 61*g* is made of sheet metal which exhibits better flame blocking properties than a flame-retardant resin. When the fire wall 61*g* is made of sheet metal as described above, for example, the sheet metal may include a mounting surface with which the fire wall 61*g* is to be mounted on the duct 61*e* and may be cut and bent from the mounting surface to form the fire wall 61*g*. Further, according to the present modification, the fire wall 61*g* is disposed in the center of the duct 61*e*. However, for example, the fire wall 61*g* may be disposed such that a lower end of the fire wall 61*g* may be disposed at the intake port 61*d*. Further, according to the present modification, unlike the configuration illustrated in FIG. 10, there is no flame that moves around the fire wall 61*g*. Accordingly, the position and size of the exhaust port 61*f* are not restricted. For this reason, the exhaust port 61*f* can be disposed at a position at which the development electromagnetic clutch 88 can be efficiently air-cooled by the air discharged from the exhaust port 61*f*.

The embodiments and variations which are described above are one example and attain advantages below in a plurality of modes from a first mode to an eighth mode.

First Mode

An electrical apparatus such as the drive device 60 includes a housing such as the resin housing 61 for covering a plurality of electrical apparatuses such as the drive motor 63 and an electromagnetic clutch, a blower such as the self-cooling fan 63*c* for blowing air, and the duct 61*e* for guiding air obtained by cooling any one of the multiple electrical apparatuses to another electrical apparatus. The duct 61*e* includes a fire wall 61*g*.

According to a first mode of the present disclosure, the fire wall can prevent the electrical apparatus to be cooled from possibly igniting and the flame from flowing into the intake port 61*d* of the duct 61*e* and directly passing through the duct 61*e* toward the exhaust port 61*f*. Accordingly, the flame ignited by the electrical apparatuses can be prevented from spreading through the duct 61*e*.

Second Mode

In the first mode, the housing such as the resin housing 61, the duct 61*e*, and the fire wall 61*g* are made of incombustible material.

According to the second mode of the present disclosure, as described in the embodiments, even if the electrical apparatuses of the drive motor 63 catch fire, the fire does not spread to the housing 61, the duct 61*e*, and the fire wall 61*g*.

Third Mode

In the first mode or the second mode, at least one of an opening of the intake port 61*d* and an opening of the exhaust port 61*f* of the duct 61*e* is formed so as to enter a region to be a shadow of the fire wall 61*g* formed when parallel light perpendicular to the wall surface of the fire wall 61*g* is irradiated from the other opening. The fire wall 61*g* includes a clearance with any one of a plurality of walls 161*e* and 162*e* that form a flow path of the duct 61*e*.

According to the third mode of the present disclosure, as described in the embodiments, when the electrical apparatus to be cooled ignites, the fire wall prevents flame of the fire from flowing from the intake port 61*d* of the duct 61*e* through the duct 61*e* to the exhaust port 61*f*. Further, the fire wall can prevent the flame from flowing through the clearance between the fire wall 61*g* and the wall 162*e* of the duct 61*e*.

Fourth Mode

In the first mode or the second mode, the fire wall 61*g* is disposed so as to partition the duct 61*e*, and the fire wall 61*g* includes the multiple small holes 161*g*.

According to the fourth mode of the present disclosure, as described in the modification, the air in the duct 61*e* can flow through the multiple small holes 161*g*. Further, each of the small holes 161*g* is a small hole. Thus, the flame can be prevented from blowing out through the small holes 161*g*.

Fifth Mode

In any one of the first to fourth modes, the duct 61*e* is formed in a housing such as the resin housing 61.

According to the fifth mode of the present disclosure, the resin housing 61 and the duct 61*e* are flame-retardant.

Sixth Mode

In any one of the first to fifth modes, one of the multiple electrical apparatuses is the drive motor 63, and the blower is the self-cooling fan 63*c* disposed in the drive motor 63.

According to the sixth mode of the present disclosure, as described in the embodiment, the self-cooling fan 63*c* blows air that cools the drive motor 63 and the air can flow to other electrical apparatuses such as the development electromagnetic clutch 88 through the duct 61*e*.

Seventh Mode

In any one of the first to sixth modes, the blower is disposed outside a housing such as the resin housing 61.

According to the seventh mode of the present disclosure, as described with reference to FIG. 9, the flow rate of air required to air-cool the multiple electrical apparatuses can be easily obtained, and the multiple electrical apparatuses can be air-cooled favorably, as compared with a case in which the self-cooling fan 63*c* is used.

Eighth Mode

In an image forming apparatus provided with an electrical apparatus such as the drive device 60, an electrical apparatus according to any one of the first to seventh modes is used as the electrical apparatus.

According to the eighth mode of the present disclosure, the fire can be prevented from spreading to the combustible member mounted on the image forming apparatus.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

The invention claimed is:

1. An electrical apparatus comprising:
   a housing covering a plurality of electrical components;
   a blower configured to blow air; and
   a duct configured to guide the air that has cooled one of the plurality of electrical components to another one of the plurality of electrical components,
   the duct including a fire wall formed integrally with the housing.

2. The electrical apparatus according to claim 1,
   wherein the housing, the duct, and the fire wall are made of noncombustible materials.

3. The electrical apparatus according to claim 1, further comprising a plurality of walls that form a flow path of the duct,
   wherein one of an intake port and an exhaust port of the duct is within a region of a shadow of the fire wall produced when a wall surface of the fire wall is irradiated with parallel light perpendicular to the wall surface of the fire wall from the other one of the intake port and the exhaust port, and
   wherein the fire wall includes a clearance with any one of the plurality of walls.

4. The electrical apparatus according to claim 1,
   wherein the fire wall partitions the duct, and
   wherein the fire wall includes a plurality of small holes.

5. The electrical apparatus according to claim 1,
   wherein the duct is in the housing.

6. The electrical apparatus according to claim 1,
   wherein one of the plurality of electrical components is a drive motor, and
   wherein the blower is a self-cooling fan disposed in the drive motor.

7. The electrical apparatus according to claim 1,
   wherein the blower is disposed outside the housing.

8. An image forming apparatus comprising the electrical apparatus according to claim 1.

9. The electrical apparatus according to claim 1, further comprising a plurality of walls that form a flow path of the duct between an intake port and an exhaust port,
   wherein the fire wall is connected to each of the plurality of walls to partition the duct except for a predetermined gap between a tip of the firewall and a lower wall on a lower portion of the duct.

10. The electrical apparatus according to claim 9,
    wherein the exhaust port is disposed on an upper portion of the duct.

11. The electrical apparatus according to claim 9,
    wherein the fire wall is disposed substantially in a center of the duct between the intake port and the exhaust port.

12. The electrical apparatus according to claim 9,
    wherein an upper wall on an upper portion of the duct faces the lower wall, and extends downward from the intake port toward the exhaust port.

13. An image forming apparatus comprising:

a housing comprising a motor housing configured to cover a drive motor, and a gear housing configured to cover an electromagnetic clutch;

a fan driven by the drive motor, and configured to blow air to cool the drive motor;

a duct between an intake port at the motor housing and an exhaust port at the gear housing, and configured to guide the air to cool the electromagnetic clutch; and a fire wall disposed in the duct between the intake port and the exhaust port, and formed integrally with the housing.

14. The image forming apparatus according to claim 13, further comprising a plurality of walls that form a flow path of the duct between the intake port and the exhaust port, wherein the fire wall is connected to each of the plurality of walls to partition the duct except for a predetermined gap between a tip of the firewall and a lower wall on a lower portion of the duct.

15. The image forming apparatus according to claim 14, wherein the exhaust port is disposed on an upper portion of the duct.

16. The image forming apparatus according to claim 14, wherein an upper wall on an upper portion of the duct faces the lower wall, and extends downward from the intake port toward the exhaust port.

17. The image forming apparatus according to claim 13, wherein the fire wall is disposed substantially in a center of the duct between the intake port and the exhaust port.

18. The image forming apparatus according to claim 13, wherein the fire wall includes a plurality of small holes.

19. An electrical apparatus comprising:

a housing covering a plurality of electrical components;

a blower configured to blow air;

a duct configured to guide the air that has cooled one of the plurality of electrical components to another one of the plurality of electrical components, wherein the duct includes a fire wall; and a plurality of walls that form a flow path of the duct between an intake port and an exhaust port, wherein the fire wall is connected to each of the plurality of walls to partition the duct except for a predetermined gap between a tip of the firewall and a lower wall on a lower portion of the duct.

20. The electrical apparatus according to claim 19, wherein the fire wall is disposed substantially in a center of the duct between the intake port and the exhaust port.

* * * * *